(12) United States Patent
Mori (10) Patent No.: US 7,756,634 B2
(45) Date of Patent: Jul. 13, 2010

(54) NAVIGATION DEVICE AND CURRENT-POSITION-CALCULATION METHOD

(75) Inventor: Daishi Mori, Tokyo (JP)

(73) Assignee: Alpine Electronics, Inc., Tokyo (JP)

( * ) Notice: Subject to any disclaimer, the term of this patent is extended or adjusted under 35 U.S.C. 154(b) by 794 days.

(21) Appl. No.: 11/623,929

(22) Filed: Jan. 17, 2007

(65) Prior Publication Data

US 2007/0168119 A1 Jul. 19, 2007

(30) Foreign Application Priority Data

Jan. 17, 2006 (JP) .............................. 2006-009070

(51) Int. Cl.
*G01C 21/00* (2006.01)
(52) U.S. Cl. ...................... 701/208; 701/207
(58) Field of Classification Search ....................... None
See application file for complete search history.

(56) References Cited

U.S. PATENT DOCUMENTS 5,383,127 A 1/1995 Shibata 5,928,299 A * 7/1999 Sekine et al. ................. 701/41
5,941,934 A * 8/1999 Sato ............................ 701/217

FOREIGN PATENT DOCUMENTS

| JP | 10-332399 | 12/1998 |
|----|-----------|---------|
| JP | 3216461 | 8/2001 |

* cited by examiner

*Primary Examiner*—Michael J. Zanelli
(74) *Attorney, Agent, or Firm*—Brinks Hofer Gilson & Lione (57) ABSTRACT

A current-position-calculation unit calculates a current position on the basis of an azimuth angle of a first point that is on an actual road and that corresponds to each of second points on a link, where the azimuth angle is calculated on the basis of a curvature of the first point, the curvature being estimated on the basis of the link, and where the azimuth angle is relative to a curve-start point calculated on the basis of the curvature progress, so that the azimuth angle of the first point corresponding to the second point calculated as the current position agrees with a travel-azimuth angle that is obtained at a current point in time calculated on the basis of a travel locus and that is relative to a curve-start-point-passing time calculated on the basis of the travel locus.

20 Claims, 7 Drawing Sheets

NAVIGATION DEVICE AND CURRENT-POSITION-CALCULATION METHOD

RELATED APPLICATIONS

The present application claims priority to Japanese Patent Application Number 2006-009070, filed Jan. 17, 2006, the entirety of which is hereby incorporated by reference.

BACKGROUND

1. Field of Invention

The present invention relates to technologies to calculate a current position through a navigation device configured to perform route guidance by using a map.

2. Description of Related Art

As an example technology to calculate a current position through a navigation device configured to perform route guidance by using a map, the following technology is disclosed in Japanese Unexamined Patent Application Publication No. 10-332399. Namely, map-matching processing is performed so as to verify a vehicle position and/or the locus of the vehicle position against the map, where the vehicle position is calculated on the basis of a vehicle speed detected by a vehicle-speed sensor mounted on a motor vehicle and a travel-azimuth angle detected by an angular-acceleration sensor and/or a terrestrial-magnetism sensor mounted on the motor vehicle. Then, a position on a road, the position being nearest to and/or matching with the vehicle position, is calculated as the current position.

Figure 7A:
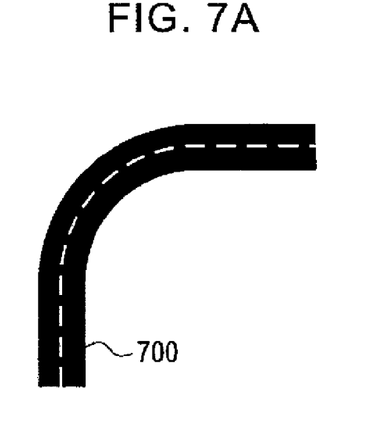
FIG. 7A is a diagram showing how the journey distance on a link and an actual travel distance are different from each other in a curve.
Figure 7B:
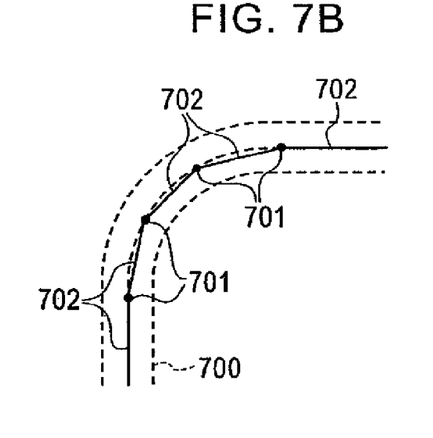
FIG. 7B is another diagram showing how the journey distance on the link and the actual travel distance are different from each other at the curve.

Here, in the map used by the navigation device, a road is usually defined as a set of links connected to one another through nodes, where each of the links is a line, Further, as shown in FIG. 7A, a curve section 700 of the road is usually defined by using the above-described links and nodes. Namely, the curve section 700 is defined by a plurality of nodes 701 and a plurality of links 702. As shown in FIG. 7B, the nodes 701 are provided on the road at predetermined intervals, where each of the nodes 701 is provided at the center of the road with reference to the road width. Further, each of the links 702 connects two nodes 701 provided in the above-described manner with one another.

Technologies to estimate the curvature of a point on an actual road, the point corresponding to each of a plurality of points on the links 702 defining the road, have been proposed. An example of the above-described technologies is disclosed in Japanese Patent No. 3216461.

Hereinafter, it is assumed that the curve section 700 shown in FIG. 7A is defined by the links 702 connecting the above-described nodes 701 with one another, as shown in FIG. 7B. In that case, when the motor vehicle travels on the inner lane and/or the outer lane of the curve section 700 of the road, the locus of the vehicle position calculated on the basis of the vehicle speed and the travel-azimuth angle is different than the road shape of the curve part indicated by the links 702 on the basis of the map data. Subsequently, it is often difficult to calculate a position on at least one of the links 702, the position corresponding to the actual position of the motor vehicle, as the current position.

Figure 7C:
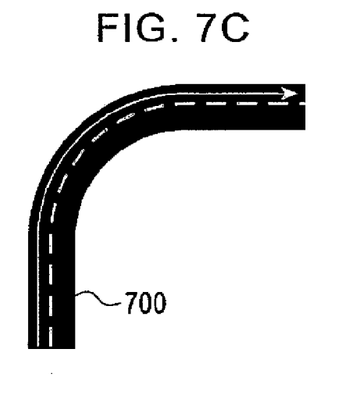
FIG. 7C is another diagram showing how the journey distance on the link and the actual travel distance are different from each other at the curve.
Figure 7D:
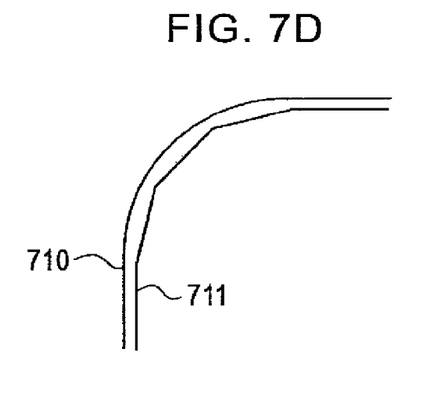
FIG. 7D is another diagram showing how the journey distance on the link and the actual travel distance are different from each other at the curve.
Figure 7E:
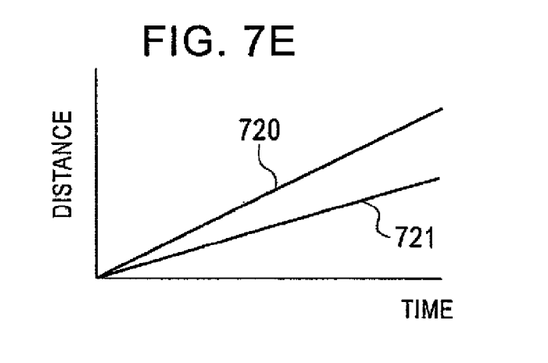
FIG. 7E is another diagram showing how the journey distance on the link and the actual travel distance are different from each other at the curve.

That is to say, when the motor vehicle travels on the outer lane of the curve part of the road, as indicated by an arrow shown in FIG. 7C, the locus of the vehicle position calculated on the basis of the vehicle speed and the travel-azimuth angle is indicated by a curve 710 shown in FIG. 7D. Thus, a difference exists between the curve 710 and a road shape 711 of the curve part, the road shape 711 being indicated by the links on the basis of the map data. Further, in that case, a difference exists between a travel distance 720 of the vehicle and a journey distance 721, and the difference accumulates and increases as the motor vehicle travels along the curve part, as shown in FIG. 7E, for example. The travel distance 720 is a distance that is calculated on the basis of the vehicle-position locus 710 and that extends from the curve entrance at each point in time. Further, the journey distance 721 is a distance along the links from the curve entrance to a position on the links, the position corresponding to the actual current position at each point in time. Here, a map-matching algorithm is used so that a position shown on the link where the previous current position was calculated is determined to be the latest current position, the position being calculated by adding to the previous position a value corresponding to a distance traveled by the motor vehicle since a point in time when the previous current position was calculated. In that case, when the above-described difference increases, it becomes difficult to calculate a current position on the map corresponding to the actual position of the motor vehicle.

BRIEF SUMMARY

Accordingly, it is an object of the present invention to provide a navigation device that can calculate the current position correctly even though the motor vehicle travels on a curved road.

For achieving the above-described object, the present invention provides a navigation device that is mounted on a motor vehicle and that calculates a current position. The navigation device includes a map-data-storage unit storing map data defining a map including a road by using at least one link which is a line, a vehicle-speed-measuring unit configured to measure a speed of the motor vehicle, an angular-velocity-measuring unit configured to measure an angular velocity of a change in a travel azimuth of the motor vehicle, and a current-position-calculation unit configured to calculate the current position repeatedly. The current-position-calculation unit includes a curvature-estimation unit configured to estimate a road curvature at a first point on a road, the first point corresponding to a second point on the link, as a corresponding curvature of the second point on the link on the basis of the map data stored in the map-data-storage unit, where the corresponding curvature is estimated for each of a plurality of the second points on the link indicating a road on which the motor vehicle is traveling, the road including the current position that was previously calculated, a start-point-corresponding-position-calculation unit configured to calculate the second point corresponding to a start point of a road-curve section where an orientation of the actual road changes as a curve-section-start-point-corresponding position on the basis of the estimated corresponding curvature of each of the plurality of second points on the link, and a current-position-estimation unit that is configured to detect that the motor vehicle enters the road-curve section when a first change occurs in a curvature of a travel locus of the motor vehicle, the travel locus being calculated on the basis of a progress of the measured vehicle speed and angular velocity, where the first change matches with a second change in the corresponding curvature, the second change being caused when the motor vehicle travels on the link from outside a first section that is on the link and that corresponds to the road-curve section, passes the curve-section-start-point-corresponding position, and enters the first section, and that is configured to estimate the calculated curve-section-start-point-corresponding position as the current position when it is detected that the motor vehicle enters the road-curve section.

According to the above-described navigation device, it is detected that the motor vehicle passes the start point of the road-curve section on the basis of a change in the curvature of the travel locus of the motor vehicle, the travel locus being obtained on the basis of the progress of the measured vehicle speed and angular speed, and the state of a change in the corresponding curvature at each of the plurality of second points on the link. When it is detected that the motor vehicle passes the start point, the current position is calculated at a position on the link, the position corresponding to the curve-section-start point. Thus, when it is detected that the motor vehicle passes the road-curve-section-start point on the basis of the change in the curvature of the travel locus of the motor vehicle and the state of the change in the corresponding curvature at each of positions on the link, it becomes possible to detect that the motor vehicle passes the road-curve-section-start point correctly irrespective of the travel speed and/or the travel distance attained by the motor vehicle. As a result, the current position corresponding to the passing point in time can be calculated correctly.

Further, for achieving the above-described object, the present invention provides a navigation device that is mounted on a motor vehicle and that calculates a current position. The navigation device includes a map-data-storage unit storing map data defining a map including a road by using at least one link which is a line, a vehicle-speed-measuring unit configured to measure a speed of the motor vehicle, an angular-velocity-measuring unit configured to measure an angular velocity of a change in a travel azimuth of the motor vehicle, and a current-position-calculation unit configured to calculate the current position repeatedly. The current-position-calculation unit includes a curvature-estimation unit configured to estimate a road curvature at a first point on a road, the first point corresponding to a second point on the link, as a corresponding curvature of the second point on the link on the basis of the map data stored in the map-data-storage unit, where the corresponding curvature is estimated for each of a plurality of the second points on the link indicating a road on which the motor vehicle is traveling, the road including the current position that was previously calculated, an end-point-corresponding-position-calculation unit configured to calculate a third point that is on the link and that corresponds to an end point of the road-curve section where the orientation of the actual road changes, as a curve-section-end-point-corresponding position, on the basis of the estimated corresponding curvature of each of the plurality of second points on the link, and a current-position-estimation unit configured to detect that the motor vehicle leaves the road-curve section when a first change occurs in a curvature of a travel locus of the motor vehicle, the travel locus being calculated on the basis of a progress of the measured vehicle speed and angular velocity, where the first change matches with a second change in the corresponding curvature, the second change being caused when the motor vehicle travels on the link from a first section that is on the link and that corresponds to the road-curve section, passes the curve-section-end-point-corresponding position, and leaves the first section, and that is configured to estimate the calculated curve-section-end-point-corresponding position as the current position when it is detected that the motor vehicle leaves the road-curve section.

According to the above-described navigation device, it is detected that the motor vehicle passes the end point of the road-curve section on the basis of a change in the curvature of the travel locus of the motor vehicle, the travel locus being obtained on the basis of the progress of the measured vehicle speed and angular speed, and the state of a change in the corresponding curvature at each of the plurality of second points on the link. When it is detected that the motor vehicle passes the end point, the current position is calculated at a position on the link, the position corresponding to the curve-section-end point. Thus, when it is detected that the motor vehicle passes the road-curve-section-end point on the basis of the change in the curvature of the travel locus of the motor vehicle and the state of the change in the corresponding curvature on each of positions on the link, it becomes possible to detect that the motor vehicle passes the road-curve-section-end point correctly irrespective of the travel distance or the like that changes according to the travel position corresponding to the inner side and/or the outer side of the road-curve section. As a result, the current position corresponding to the passing point in time can be calculated correctly.

Still further, for achieving the above-described object, the present invention provides a navigation device that is mounted on a motor vehicle and that calculates a current position. The navigation device includes a map-data-storage unit storing map data defining a map including a road by using at least one link which is a line, an angular-velocity-measuring unit configured to measure an angular velocity of a change in a travel azimuth of the motor vehicle, and a current-position-calculation unit configured to calculate the current position repeatedly. The current-position-calculation unit includes a corresponding-azimuth-angle-estimation unit configured to estimate an azimuth angle of a road orientation at a first point on the road, the first point corresponding to a second point on the link, as a corresponding-azimuth angle of the second point on the link, on the basis of the stored map data, where the corresponding-azimuth angle is estimated for each of the plurality of second points on the link indicating the road on which the motor vehicle is traveling, the road including the current position that was previously calculated, and a current-position-estimation unit configured to calculate an azimuth angle in a travel direction of the motor vehicle as a travel-azimuth angle on the basis of a progress of the measured angular velocity, and estimate a third point on the link as the current position, where the estimated corresponding azimuth angle agrees with the calculated travel-azimuth angle at the third point.

According to the navigation device, when the motor vehicle passes the road-curve section such as a curve, the azimuth angle of a road orientation of the road is estimated at each of a plurality of the first points corresponding to the second points on the link as the corresponding azimuth angle, and the current position can be calculated so that the corresponding-azimuth angle of a point that is on the link and that is calculated as the current position agrees with the travel-azimuth angle of the motor vehicle, where the travel-azimuth angle is calculated on the basis of the progress of the angular velocity of the motor vehicle. Therefore, it becomes possible to calculate the current position correctly while the motor vehicle passes through the road-curve section irrespective of the travel distance or the like that changes according to the travel position corresponding to the inner side or the outer side of the road.

Here, the above-described navigation device further includes a vehicle-speed-measuring unit configured to measure a speed of the motor vehicle, and a curve-section-start-point-passing-calculation unit configured to calculate a road-curve-travel-start time where the motor vehicle passes a start point of a road-curve section where an orientation of the road changes on the basis of the map data and a travel locus of the motor vehicle, the travel locus being obtained on the basis of a progress of the measured vehicle speed and angular velocity, and calculate the road-curve-section-start point where the motor vehicle passes at the road-curve-travel-start time as a road-curve-section-passing-start point. The corresponding-azimuth-angle-estimation unit estimates an azimuth angle of a first road orientation at the first point on the road, the first point corresponding to the second point on the link, where the azimuth angle is relative to a second road orientation of the calculated road-curve-section-passing-start point as the corresponding-azimuth angle of the second point on the link. The current-position-estimation unit calculates an azimuth angle in a travel direction of the motor vehicle, the azimuth angle being relative to an azimuth angle in a travel direction of the motor vehicle at the calculated road-curve-travel-start point, as the travel-azimuth angle.

Accordingly, the current position can be calculated with precision by using the road-curve-section-start point and/or the road-curve-travel-start time that can be detected with relatively high precision as the reference position and/or the reference point in time of the corresponding-azimuth angle and/or the travel-azimuth angle. Further, the corresponding-azimuth-angle-estimation unit of the above-described navigation device may include a curvature-estimation unit configured to estimate a road curvature at the first point on the road, the first point corresponding to the second point on the link, as a corresponding curvature of the second point on the link, where the corresponding curvature is estimated for each of the plurality of second points on the link. Further, the corresponding-azimuth-angle-estimation unit may estimate the corresponding-azimuth angle of the second point on the link on the basis of the estimated corresponding curvature.

In each of the navigation device including the start-point-corresponding-position-calculation unit, the navigation device including the end-point-corresponding-position-calculation unit, and the navigation device including the corresponding-azimuth-angle-estimation unit, it is preferable that the curvature-estimation unit determines the second point where the road curvature of the first point corresponding to the second point is estimated to be an estimation point, determines an average length of at least two links around the estimation point to be a reference distance, determines two points to be a first reference point and a second reference point when a journey distance between the first and second reference points becomes the reference distance, the journey distance extending from the estimation point along the link, calculates an azimuth difference between a first orientation from the first reference point to the estimation point and a second orientation from the estimation point to the second reference point, and estimates the road curvature at a fourth point on the road, the fourth point corresponding to the estimation point, based on the premise that the azimuth difference calculated for the reference distance occurs, so as to estimate the corresponding curvature with precision.

The configurations of the navigation device including the start-point-corresponding-position-calculation unit, the navigation device including the end-point-corresponding-position-calculation unit, and the navigation device including the corresponding-azimuth-angle-estimation unit can be used in combination as required.

Thus, the present invention provides a navigation device that can calculate the current position of a motor vehicle with precision even though the motor vehicle travels through a road that is not straight.

DETAILED DESCRIPTION OF THE PREFERRED EMBODIMENTS

Hereinafter, embodiments of the present invention will be described.

Figure 1:
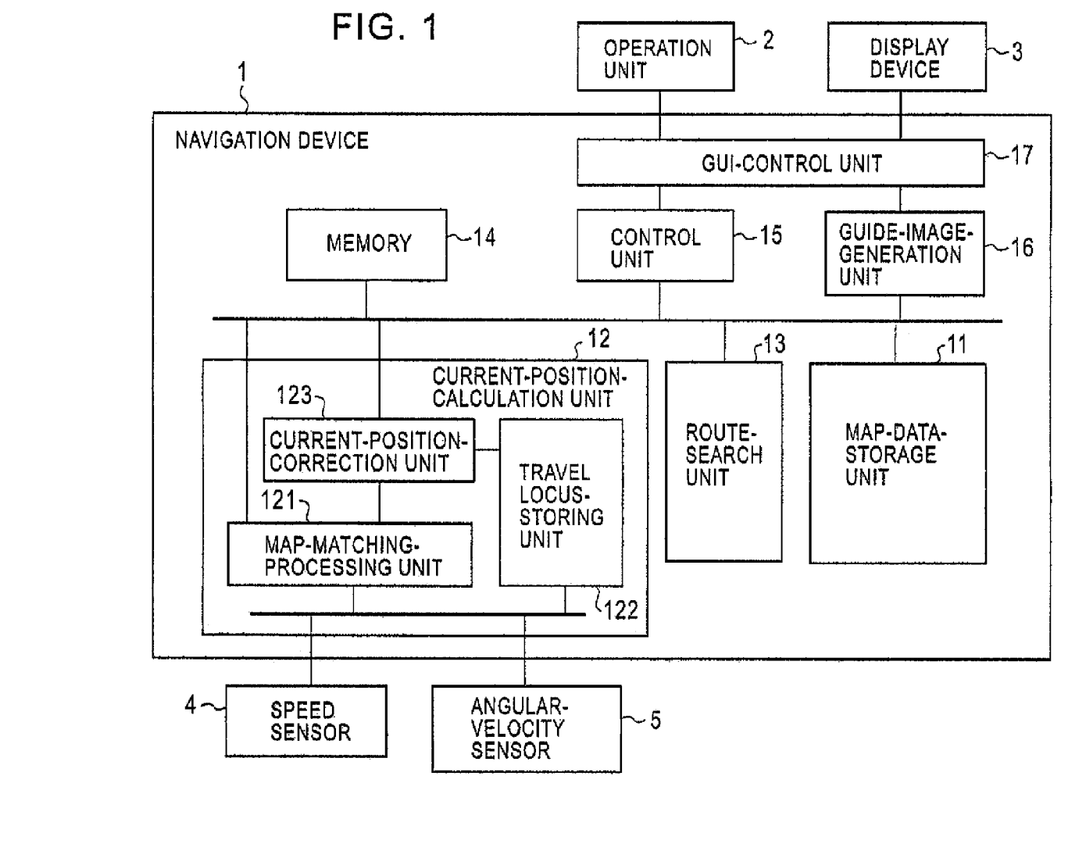
FIG. 1 is a block diagram showing the configuration of a navigation device according to an embodiment of the present invention.

FIG. 1 shows the configuration of a navigation system according to an embodiment of the present invention. The navigation system may be mounted in a motor vehicle.

As shown in FIG. 1, the navigation system includes a navigation device 1, an operation unit 2, a display device 3, a vehicle-speed sensor 4, and an angular-velocity sensor 5. Here, the vehicle-speed sensor 4 is a vehicle-speed-pulse sensor or the like configured to detect the speed of the motor vehicle. The angular-velocity sensor 5 is a sensor configured to detect a travel-azimuth-angle-change speed of the motor vehicle on the basis of an angular acceleration, a terrestrial-magnetism direction, and so forth.

The navigation device 1 includes a map-data-storage unit 11 which may include a DVD drive and/or an HDD storing map data for showing a map, a current-position-calculation unit 12, a route-search unit 13, a memory 14, a control unit 15, a guide-image-generation unit 16, and a graphical user interface (GUI)-control unit 17 configured to present a GUI to a user by using the operation unit 2 and the display device 3.

Further, the current-position-calculation unit 12 includes a map-matching-processing unit 121, a travel-locus-storage unit 122, and a current-position-correction unit 124.

The map data stored in the map-data-storage unit 11 defines a road as a set of links connected to one another by nodes, where each of the links is a straight line.

However, in terms of hardware, the above-described navigation device 1 may be implemented as a central-processing-unit (CPU) circuit with a normal configuration. Namely, the CPU circuit may include peripheral devices including a microprocessor, a memory, and other processors including a graphic processor, a geometric processor, and so forth. In that case, each of the above-described units of the navigation device 1 may be implemented as a process embodied by a microprocessor executing a program that had already been prepared. In that case, the above-described program may be transmitted to the navigation device 1 via a recording medium and/or an appropriate communication path.

According to the above-described configuration, the current-position-calculation unit 12 of the navigation device 1 performs the following processing repeatedly.

Namely, the current-position-calculation unit 12 calculates coordinates that are most probable as the current position, and a direction that is most probable as the current travel direction, by using the vehicle-speed information transmitted from the vehicle-speed sensor 4 and/or the angular-velocity information transmitted from the angular-velocity sensor 5, and the map data read from the map-data-storage unit 11. Then, the current-position-calculation unit 12 provides data on the most probable coordinates to the memory 14 as the current-position data, and provides data on the most probable direction to the memory 14 as the current-travel-azimuth data. The detailed operations performed by the current-position-calculation unit 12 to calculate the current position and the current-travel-azimuth will be described later.

The control unit 15 receives destination-setting information via the operation unit 2 and the GUI-control unit 17 in response to a destination-setting request transmitted from the user. Then, the control unit 15 provides the destination-setting information to the memory 14 so that the route-search unit 13 searches for a recommended route leading to the destination. The route-search unit 13 calculates a minimum-cost path from the current position on which data is stored in the memory 14 to the destination on the basis of the map data read from the map-data-storage unit 11, as the recommended route on the basis of a predetermined cost model indicating the minimum distance or the like. Then, the route-search unit 13 provides data on the calculated recommended route to the memory 14.

When the current-position data in the memory 14 indicates that the motor vehicle approaches the destination, the control unit 15 determines that the motor vehicle arrives at the destination and clears the recommended-route data that is stored in the memory 14.

The control unit 15 performs the following guide-image-generation processing repeatedly. Namely, the control unit 15 sets the current-position data and/or data on a position specified by the user as reference-position data, sets data on a display azimuth so that the current-travel-azimuth on which data is stored in the memory 14 and/or an azimuth selected by the user is shown in the upper part of a screen image, and sets the map scale according to settings made by the user and/or initial settings. Then, the control unit 15 determines a geographic area of a predetermined size around the reference position as a map-display area, on the basis of the display azimuth and the map scale.

Then, the control unit 15 instructs the guide-image-generation unit 16 to draw a guide image including the map of an area included in the determined map-display area. Upon receiving the guide-image-drawing instruction transmitted from the control unit 15, the guide-image-generation unit 16 draws a map image showing the map of the map-display area on the basis of the map data stored in the map-data-storage unit 11, where the map is drawn at the set map scale and the display azimuth is determined so that the azimuth selected by the user is shown at the upper part of the map. Further, when the current position on which data is stored in the memory 14 is included in the map-display area, the guide-image-generation unit 16 shows the current position on the map image. Namely, the guide-image-generation unit 16 draws a current-position mark indicating the current-travel-azimuth on which data is stored in the memory 14 on the map image. Further, when the recommended-route data is stored in the memory 14, the guide-image-generation unit 16 draws recommended-route graphics on the map image, where the recommended-route graphics show part of the map-display area corresponding to the current position of the motor vehicle traveling on the recommended route and the forward area. When the destination on which data is stored in the memory 14 is included in the map-display area, the guide-image-generation unit 16 also draws a destination mark showing the destination position on the map image.

The guide-image-generation unit 16 produces the map image subjected to the above-described drawing processing on the display device 3, via the GUI-control unit 17, as the guide image.

Figure 2:
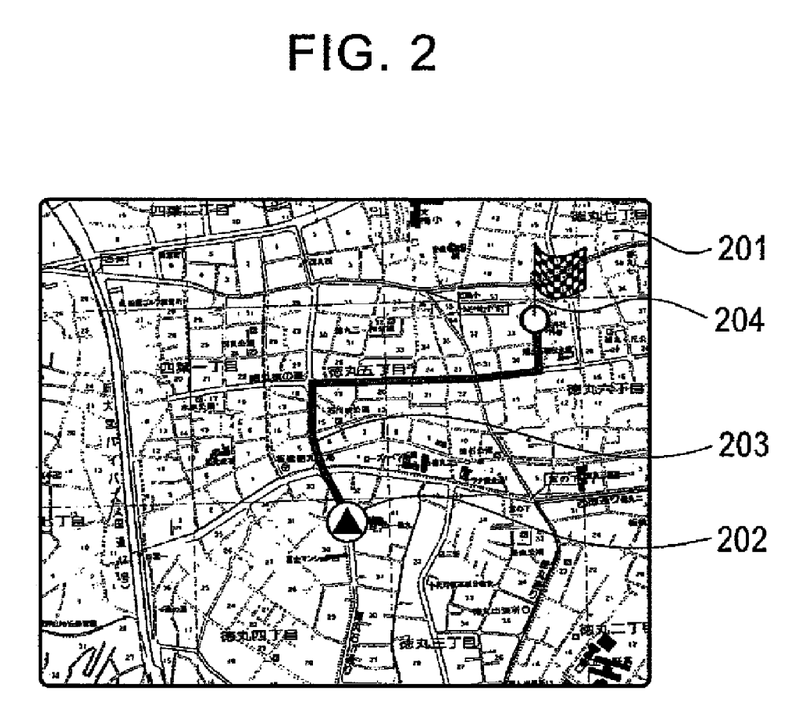
FIG. 2 is a diagram showing an example display screen image produced by the above-described navigation device.

FIG. 2 is an example of the guide image produced in the above-described method. As shown in FIG. 2, the guide image includes a map image 201 on which a current-position mark 202, recommended-route graphics 203, and a destination mark 204 are shown.

Hereinafter, the detailed operations performed by the current-position-calculation unit 12 to calculate the current position and the current-travel-azimuth will be described.

First, the travel-locus-storage unit 122 of the current-position-calculation unit 12 stores data on the travel locus of the user's vehicle, where the travel-locus data is calculated on the basis of the vehicle speed detected by the vehicle-speed sensor 4 and the angular velocity detected by the angular-velocity sensor 5.

Further, the map-matching-processing unit 121 of the current-position-calculation unit 12 performs map-matching processing by using predetermined map-matching algorithms, including the user's vehicle position calculated on the basis of the vehicle speed detected by the vehicle-speed sensor 4, the angular velocity detected by the angular-velocity sensor 5, the previous current position calculated by the current-position-correction unit 124, the locus of the vehicle position on which data is stored in the travel-locus-storage unit 122, and the map data read from the map-data-storage unit 11. Subsequently, the map-matching-processing unit 121 calculates a position on a link, that is, the position which is nearest to and/or matches with the current vehicle position and the orientation of the link. Then, the map-matching-processing unit 121 determines the calculated matching position on the link to be a map-matching position, determines the calculated link orientation to be a map-matching azimuth, and stores information about the map-matching position and the map-matching azimuth in the current-position-correction unit 124.

Figure 3:
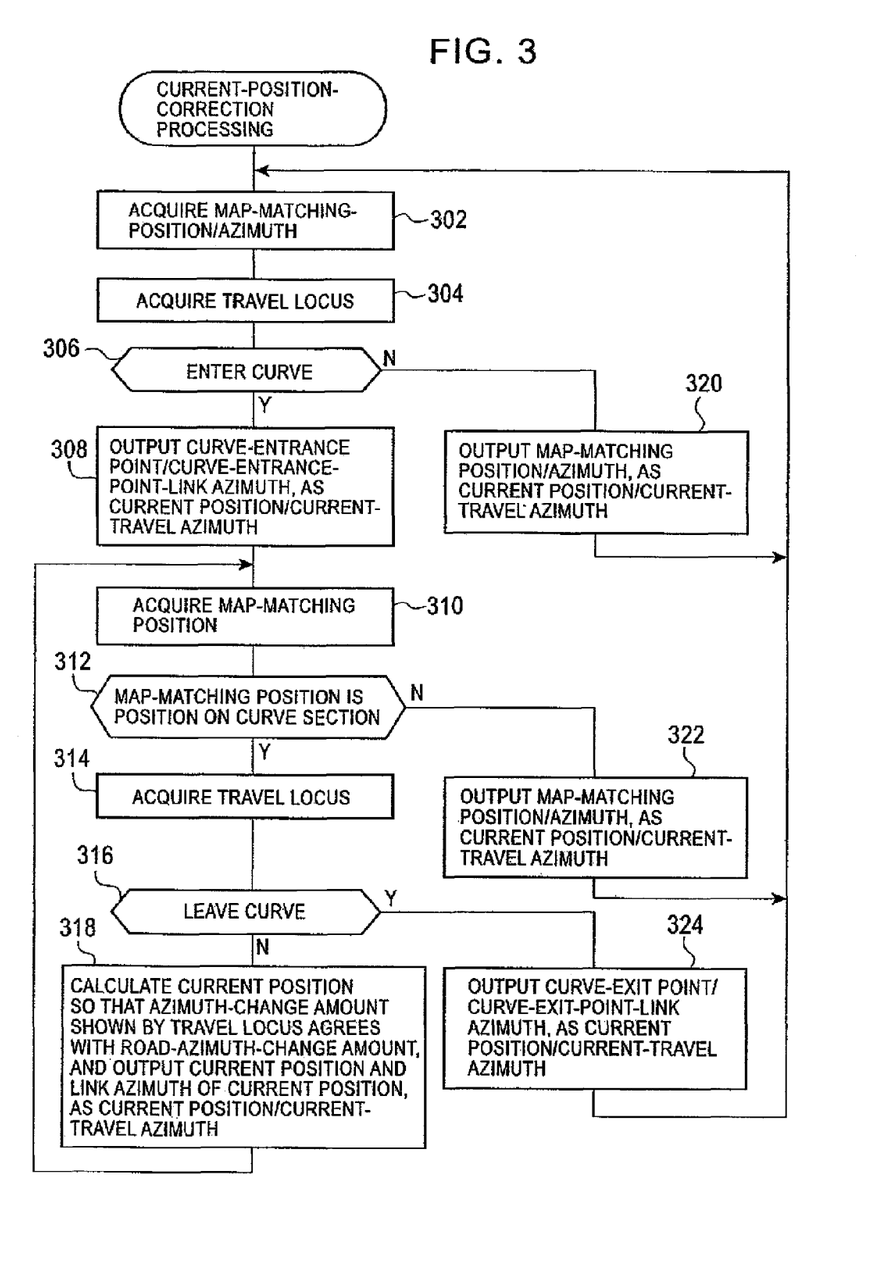
FIG. 3 is a flowchart showing current-position-correction processing performed by the above-described navigation device.

The current-position-correction unit 124 calculates the current position and the current-travel-azimuth by performing current-position-correction processing shown in FIG. 3. As shown in FIG. 3, first, data on the map-matching position and the map-matching azimuth is acquired from the map-matching-processing unit 121 (step 302). Further, the travel-locus data is acquired from the travel-locus-storage unit 122 (step 304).

Figure 4A:
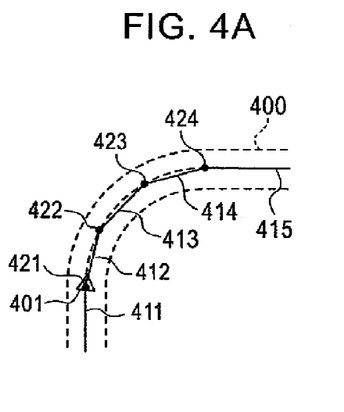
FIG. 4A is a diagram showing the relationship between a journey distance measured at each of second points on at least one link and the curvature of a first point that is on a road and that corresponds to the second point, and the relationship between an actual travel distance and an angular velocity, where information about the above-described relationship is used to perform the above-described current-position-correction processing.

Next, it is determined whether or not the vehicle presently enters the entrance of a curve (step 306). This determination is made as follows. First, links around the map-matching position are obtained, the links generating the same line as that of the link on which the map-matching position is calculated. For example, when a position 401 shown in FIG. 4A is calculated as the map-matching position, a link 411 on which the map-matching position 401 is calculated, and links 412, 413, 414, and 415 that are shown around the position 401 are obtained. Here, the obtained links denote a peripheral road 400 existing around the map-matching position, where the vehicle travels and/or may travel on the peripheral road 400.

Figure 4B:
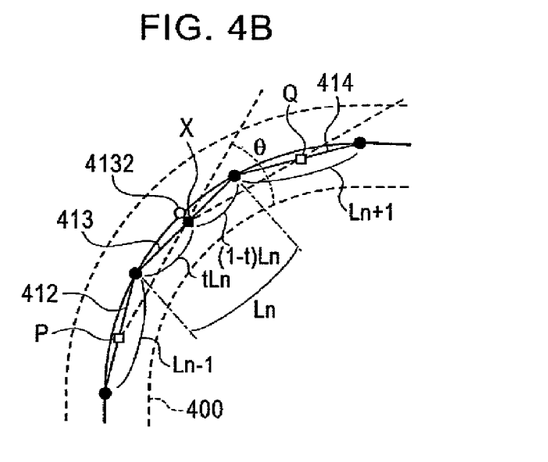
FIG. 4B is another diagram showing the relationship between the journey distance measured at each of the second points on the at least one link and the curvature of the first point that is on the road and that corresponds to the second point, and the relationship between the actual travel distance and the angular velocity, where the information about the above-described relationship is used to perform the above-described current-position-correction processing.

Next, the curvatures of points on an actual road, the points corresponding to points on the obtained links, are calculated and determined to be the curvatures corresponding to those of the points on the obtained links. These curvatures are calculated as follows, for example. Namely, as shown in FIG. 4B, when a point X for which the corresponding curvature is obtained is a point which internally divides the link 413 of length Ln in the ratio of t:(1−t), where the expression 0<t<1 holds, the link 413 is divided in two parts at the point X. The length of one of the two parts is determined to be tLn and the length of the other of the two parts is determined to be (1−t)Ln. When the length of the link 412 linked up with the part of the length tLn is determined to be Ln−1, and the length of the link 414 linked up with the part of the length (1−t)Ln is determined to be Ln+1, the following expression:

$$[(1-t)\{(Ln-1)+(Ln)\}+t\{(Ln)+(Ln+1)\}]/2$$

is obtained as a reference distance L. Further, when the point X is on a node which links the links 413 and 412 with each other, the reference distance L can be obtained by applying the equation t=0 for the above-described expression.

Then, points P and Q are set so that a journey distance extending from the point X along the links becomes equivalent to the reference distance L. After that, an azimuth difference θ between the vector from the point P through the point X, and the vector from the point X through the point Q is calculated, and θ/L is determined to be a corresponding curvature of the point X, the corresponding curvature indicating the curvature of a point 4132 shown on the actual road and corresponding to the point X.

Here, the reference distance L set according to the above-described method indicates the average length of the links shown around the point X. Since the reference distance L is set according to the average length of the links shown around the point X, it becomes possible to avoid setting the point P and/or the point Q on the link on which the point X is set, which makes it difficult to calculate the curvature. Further, it becomes possible to avoid setting the point P and/or the point Q on a link which is significantly far from the link on which the point X is set, which leads to calculation of a corresponding curvature significantly different from the curvature of a point on the actual road and corresponding to the point X.

After calculating the curvatures corresponding to the points on the links, the relationship between the journey distance along the links from a start point, the journey distance being obtained when the vehicle travels on the links indicating the peripheral road in a direction that agrees with the map-matching azimuth at each of the points on the links indicating the peripheral road, and a corresponding curvature of the point is obtained. Further, when the vehicle travels on the links indicating the peripheral road in a direction in which the journey distance increases, a predetermined point is set as a curve-entrance point. At the predetermined point, the corresponding curvature starts changing so that the value thereof increases to a level higher than a predetermined level or decreases to a level lower than the predetermined level. Further, the journey distance from the predetermined point to the map-matching position is equivalent to or smaller than a predetermined distance. If the above-described curve-entrance point does not exist, there is no curve section in the peripheral road and it is determined that the vehicle does not enter the curve entrance presently.

On the other hand, if the curve-entrance point exists and the user's vehicle travels on the links indicating the peripheral road from the curve-entrance point in a direction in which the journey distance increases, the vehicle reaches a predetermined point where the corresponding-curvature value becomes zero. The predetermined point is determined to be a curve-exit point. Further, a section shown on the links indicating the peripheral road from the curve-entrance point to the curve-exit point is determined to be a curve section.

When the curve-entrance point is determined and the value of the travel-locus curvature changes from zero to a level higher than a predetermined level in the same direction as that in which the value of the corresponding curvature changes when the vehicle advances from the curve-entrance point into the curve section, it is determined that the vehicle presently enters the curve entrance. Otherwise, it is determined that the vehicle does not enter the curve entrance presently.

Figure 4C:
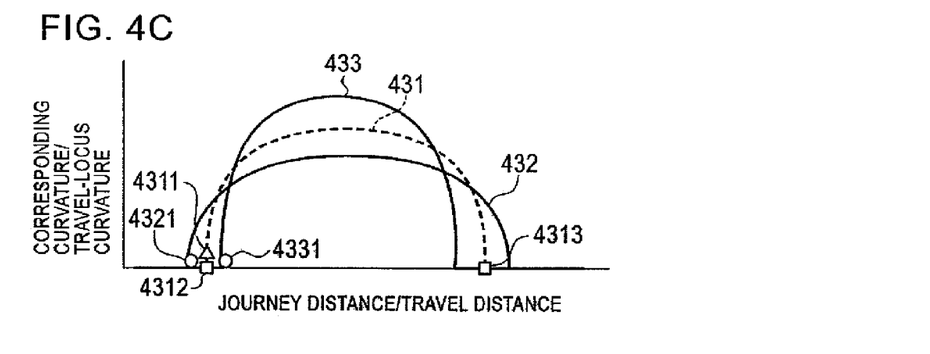
FIG. 4C is another diagram showing the relationship between the journey distance measured at each of the second points on the at least one link and the curvature of the first point that is on the road and that corresponds to the second point, and the relationship between the actual travel distance and the angular velocity, where the information about the above-described relationship is used to perform the above-described current-position-correction processing.

That is to say, when the links 411, 412, 413, 414, and 415 shown in FIG. 4A are obtained as the links forming the peripheral road 400, the relationship between the journey distance attained at each point on the links forming the peripheral road 400 and the corresponding curvature of the point is shown as a dotted line 431 shown in FIG. 4C. When the map-matching position corresponds to a point 4311 shown in FIG. 4C, the point (the position of a node 421) corresponding to a point 4312 is determined to be the curve-entrance point. At the point corresponding to the point 4312, the difference between the point 4311 and the journey distance is equivalent to or smaller than a predetermined distance. Further, at the point 4312, the value of the corresponding curvature changes to a level higher than a predetermined level when the vehicle travels in a direction in which the journey distance increases. Further, the point (the position of a node 424) corresponding to a point 4313 is determined to be the curve-exit point. At the point 4313, the value of the corresponding curvature becomes zero again when the vehicle further travels in the direction in which the journey distance increases. In that case, a section of the peripheral road, the section corresponding to a section between the curve-entrance point and the curve-exit point, is determined to be the curve section.

Figure 4D:
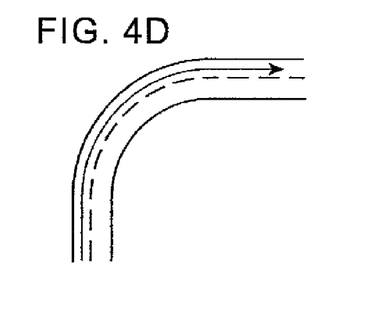
FIG. 4D is another diagram showing the relationship between the journey distance measured at each of the second points on the at least one link and the curvature of the first point that is on the road and that corresponds to the second point, and the relationship between the actual travel distance and the angular velocity, where the information about the above-described relationship is used to perform the above-described current-position-correction processing.
Figure 4E:
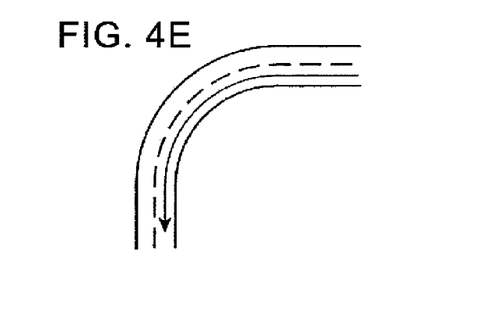
FIG. 4E is another diagram showing the relationship between the journey distance measured at each of the second points on the at least one link and the curvature of the first point that is on the road and that corresponds to the second point, and the relationship between the actual travel distance and the angular velocity, where the information about the above-described relationship is used to perform the above-described current-position-correction processing.

When the vehicle travels on the outer lane of the curve section of the actual road, the curve section being indicated by the links 411 to 415 forming the peripheral road 400, as indicated by an arrow shown in FIG. 4D, the relationship between the travel distance and the curvature of the travel locus is shown by a curve 432 in FIG. 4C. Further, when the vehicle travels on the inner lane of the curve section of the actual road, the curve section being indicated by the links 411 to 415 forming the peripheral road 400, as indicated by an arrow shown in FIG. 4E, the relationship between the travel distance and the curvature of the travel locus is shown by a curve 433 in FIG. 4C. However, the start point of the travel distance at that time is undefined.

When the vehicle travels on the outer lane and a point 4321 where the value of the travel-locus curvature starts increasing is detected, it is determined that the vehicle enters the curve entrance presently. Further, when the vehicle travels on the inner lane and a point 4331 where the value of the travel-locus curvature starts increasing is detected, it is determined that the vehicle enters the curve entrance presently.

Returning to FIG. 3, if it is determined that the vehicle does not enter the curve entrance presently (step 306), information about the acquired map-matching position and map-matching azimuth is output, as it is, as information about the current position and the current travel azimuth (step 320) and the processing returns to step 302.

On the other hand, if it is determined that the vehicle enters the curve entrance presently (step 306), the curve-entrance point calculated according to the above-described method is calculated as the current position, and the azimuth of a link in which the current position exists is calculated as the current-travel azimuth. Then, information about the calculated current position and current-travel azimuth is output (step 308). After that, the following processing procedures are performed.

First, information about the map-matching position and the map-matching azimuth is acquired from the map-matching processing unit 121 (step 310). Then, it is checked whether or not the map-matching position is a position shown on the curve section that had been determined (step 312). If the map-matching position does not exist on the curve section, the previously output current position is erroneously calculated. In that case, it is highly possible that the vehicle does not exist on the road corresponding to the determined curve section. Therefore, the acquired information about the map-matching position and the map-matching azimuth is output, as it is, as the information about the current position and the current-travel azimuth (step 322), and the processing returns to step 302.

On the other hand, if the map-matching position exists on the curve section, information about the travel locus is acquired from the travel-locus-storage unit 122 (step 314), and it is determined whether or not the vehicle leaves the curve exist presently (step 316).

The above-described determination about whether or not the vehicle leaves the curve exit presently is made as follows. Namely, when the previously calculated current position is near the curve exit and the value of the travel-locus curvature changes to zero in the same direction as that in which the corresponding curvature changes when the vehicle travels from the curve-exit point and goes out of the curve section, it is determined that the vehicle leaves the curve exit. Otherwise, it is determined that the vehicle does not leave the curve exit presently.

If it is determined that the vehicle leaves the curve exit presently (step 316), the curve-exit point that had been set is calculated as the current position, and the azimuth of the link in which the current position exists is calculated as the current-travel azimuth. Then, information about the calculated current position and current-travel azimuth is output (step 324), and the processing returns to step 302.

On the other hand, if it is determined that the vehicle does not leave the curve exit presently (step 316), a calculation is made so that the current position exists on a predetermined link. At the current position, the amount of a change in the azimuth angle of the vehicle over a time period from when the vehicle passes the curve-entrance point to the present, the change amount being obtained from the travel locus, agrees with the integral of the corresponding curvature of a section shown on the links indicating the peripheral road, the section corresponding to a segment from the curve-entrance point that had been calculated to the current position. Further, the azimuth of the link on which the current position exists is calculated as the current-travel azimuth, and information about the calculated current position and current-travel azimuth is output (step 318). Then, the processing returns to step 302. Here, the integral of the corresponding curvature of the section shown on the links indicating the peripheral road, the section corresponding to the segment from the curve-entrance point to the current position, denotes the amount of a change in the azimuth of a predetermined section of the actual road corresponding to a segment from the point corresponding to the curve-entrance point to a predetermined point shown on the actual road, the predetermined point corresponding to a point shown on the link on which the current position is set.

The current-position calculation performed at step 318 will be described in detail below.

Figure 5A:
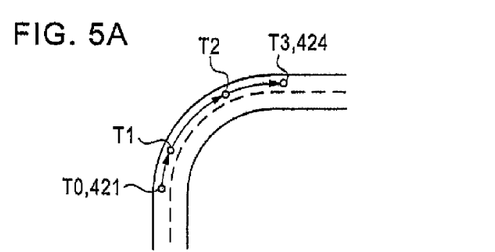
FIG. 5A is a diagram showing the theory of calculating the current position by performing the current-position-correction processing by using the above-described navigation device.

In the above-described embodiment, the curve-entrance point 421, the curve-exit point 424, and the curve section are determined as shown in FIGS. 4A and 4C. When the vehicle passes a predetermined point shown on the actual peripheral road at point T0 in time, the point corresponding to the curve-entrance point 421, travels on the outer lane of the curve section, passes the points shown in FIG. 5A at points T1 and T2 in sequence, and reaches a predetermined point on the actual peripheral road at point T3, the predetermined point corresponding to the curve-exit point 424, the current position corresponding to each of points T1 and T2 is calculated as below.

Figure 5B:
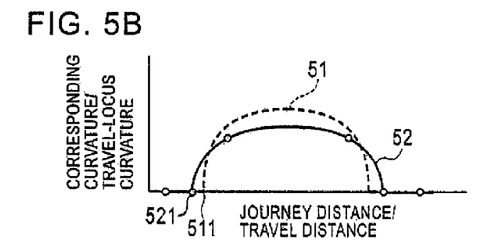
FIG. 5B is another diagram showing the theory of calculating the current position by performing the current-position-correction processing by using the above-described navigation device.
Figure 5C:
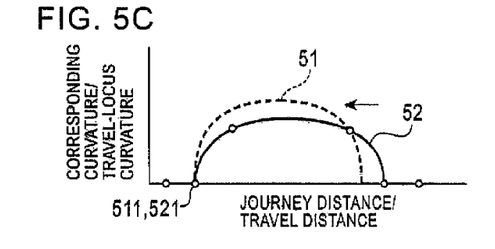
FIG. 5C is another diagram showing the theory of calculating the current position by performing the current-position-correction processing by using the above-described navigation device.

First, a curve 51 showing the relationship between the corresponding curvature of each point on the links indicating the peripheral road and the journey distance and a curve 52 showing the relationship between the travel distance and the curvature of the travel locus are obtained, as shown in FIG. 5B. Then, the curve 52 is translated so that a point 511 on the curve 51, the point 511 corresponding to the curve-entrance point, agrees with a point 521 on the curve 52, the point 521 corresponding to the travel distance attained by the vehicle which passed a predetermined point existing on the actual peripheral road at the point T0 in time, the predetermined point corresponding to the curve-entrance point 421. However, since the above-described translation is performed for the sake of simplifying the following description, the translation may not be performed in actuality.

The point T0 in time where the vehicle passes a point on the actual peripheral road corresponding to the curve-entrance point 421 may be set as a point in time where it is determined that the vehicle enters the curve entrance presently, at step 306. Further, a point where the curve 52 starts showing a change in the curvature value at a point T1 in time may be calculated as the point that is on the curve 52 and that corresponds to the curve-entrance point. The curvature value is changed from zero in the same direction as that in which the corresponding-curvature value changes from zero, where the corresponding-curvature-value change starts from the point 511 that is on the curve 51 and that corresponds to the curve-entrance point. Then, the point in time corresponding to the calculated point may be estimated and set as the point T0 in time where the vehicle passes the point that is on the actual peripheral road and that corresponds to the curve-entrance point 421.

Figure 5D:
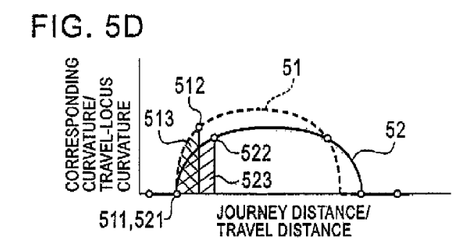
FIG. 5D is another diagram showing the theory of calculating the current position by performing the current-position-correction processing by using the above-described navigation device.
Figure 6:
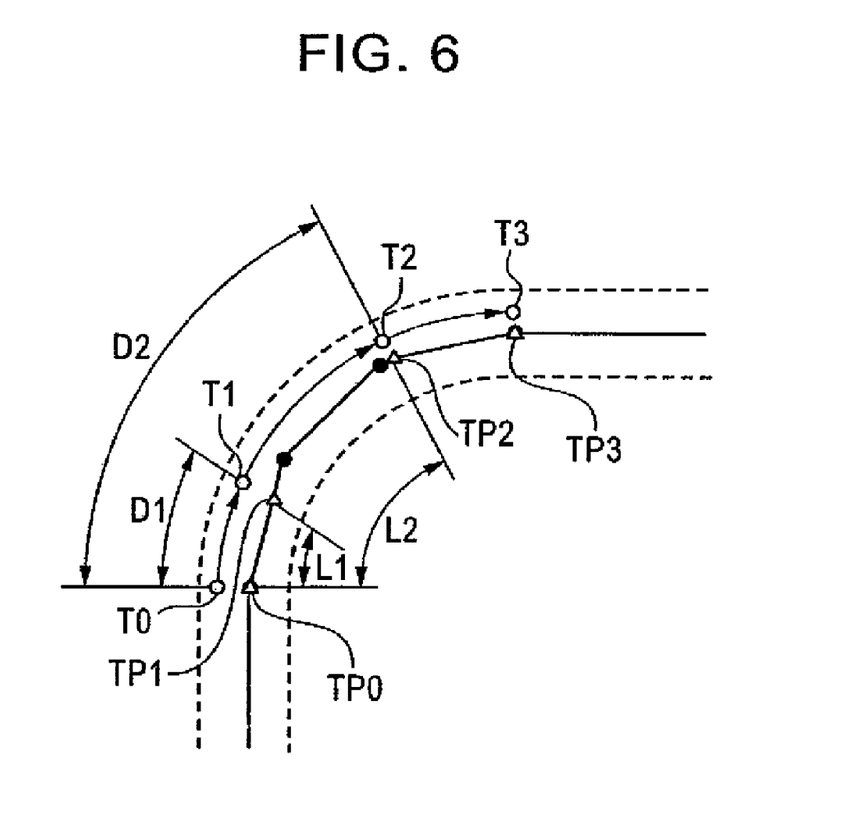
FIG. 6 is a diagram showing an example current position calculated through the current-position-correction processing performed by the above-described navigation device.

Then, as shown in FIG. 5D, the integral of the curve 52 corresponding to a section between the point 521 that is on the curve 52 and that corresponds to the point T0 in time, and the point 522 corresponding to the point T1 in time on the curve 52 is calculated. The point 522 is obtained by adding a predetermined value to the point 521, the predetermined value corresponding to a travel distance D1 attained over a time period from the point T0 in time to the point T1 in time, as shown in FIG. 6. Here, the above-described integral denotes the area of a diagonally-shaded area 523 shown in FIG. 5D. Further, the integral may be calculated as the time integral of the angular velocity of the vehicle, the angular velocity being measured over the time period from the point T0 in time to the point T1 in time.

Further, the journey distance corresponding to the point 512 is calculated so that the integral of the curve 51 corresponding to a section between the point 511 that is on the curve 51 and that corresponds to the curve-entrance point and the point 512 on the curve 51 agrees with the calculated integral of the curve 52. Here, the above-described integral denotes the area of a diagonally-shaded part 513 shown in FIG. 5D. Further, the calculated journey distance is indicated by L1 shown in FIG. 6. A point TP0 shown in FIG. 6 corresponds to the curve-entrance point.

Further, as shown in FIG. 6, a position TP1 on the links indicating the peripheral road is calculated as the current position measured at the point T1 in time. The position TP1 can be obtained by adding a predetermined value to the position TP0 corresponding to the curve-entrance point, where the predetermined value corresponds to a distance indicated by a difference between the journey distance at the point 521 and that at the point 522.

Figure 5E:
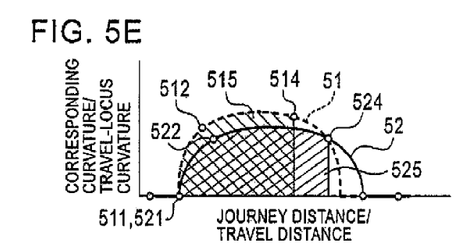
FIG. 5E is another diagram showing the theory of calculating the current position by performing the current-position-correction processing by using the above-described navigation device.

Next, the current position measured at the point T2 in time is also calculated according to the above-described method. Namely, the integral of the curve 52 corresponding to a section between the point 521 and a point 524 on the curve 52 is calculated. The point 524 is obtained by adding a predetermined value to the point 521, the predetermined value corresponding to a travel distance D2 attained over a time period from the point T0 in time to the point T2 in time, as shown in FIG. 6. Here, the above-described integral denotes the area of a diagonally-shaded part 525 shown in FIG. 5E. Further, the integral may be calculated as the time integral of the angular velocity of the vehicle, the angular velocity being measured over the time period from the point T0 in time to the point T2 in time.

Further, the journey distance corresponding to a point 514 is calculated so that the integral of the curve 51 corresponding to a section between the point 511 and the point 514 on the curve 51 agrees with the integral of the curve 52, the integral being calculated at the point T2 in time. Here, the above-described integral denotes the area of a diagonally-shaded part 515 shown in FIG. 5E. Further, the calculated journey distance is indicated by L2 shown in FIG. 6.

Therefore, as shown in FIG. 6, a position TP2 on the links indicating the peripheral road is calculated as the current position measured at the point T2 in time. The position TP2 can be obtained by adding a predetermined value to the position TP0 corresponding to the curve-entrance point, where the predetermined value corresponds to a distance indicated by a difference between the journey distance at the point 521 and that at the point 524.

Figure 5F:
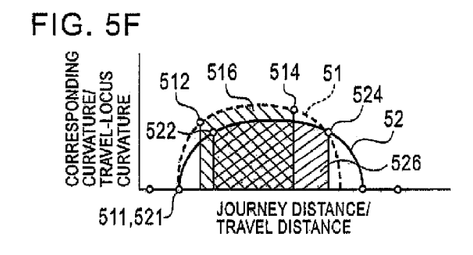
FIG. 5F is another diagram showing the theory of calculating the current position by performing the current-position-correction processing by using the above-described navigation device.

At the point T2 in time, the current position may be calculated as follows.

Namely, as shown in FIG. 5F, the integral of the part of the curve 52 corresponding to a section between the points 522 and 524 on the curve 52 is calculated. The point 522 corresponds to the end point of the section in which the integral is calculated at the point T0 in time where the previous current position was calculated. Further, the point 524 is obtained by adding a predetermined value to the point 522, the predetermined value corresponding to a distance traveled by the vehicle over the time period from the point T1 in time to the point T2 in time. Here, the above-described integral corresponds to the area of a diagonally-shaded part 526 shown in FIG. 5F. Further, the above-described integral may be calculated as the time integral of the angular velocity of the vehicle, the angular velocity being measured over the time period from the point T1 in time to the point T2 in time.

Further, the journey distance corresponding to the point 514 is calculated so that the integral of the part of the curve 51 corresponding to a section between the point 512 on the curve 51 and that corresponds to the point T0 in time and the point 514 on the curve 51 agrees with the integral of the curve 52, the integral being calculated at the point T2 in time. Here, the above-described integral denotes the area of a diagonally-shaded part 516 shown in FIG. 5F.

Then, as shown in FIG. 6, the position TP2 on the links indicating the peripheral road is calculated as the current position measured at the point T2 in time. The position TP2 can be obtained by adding a predetermined value to the previously calculated current position TP1, where the predetermined value corresponds to a distance indicated by a difference between the journey distance at the point 522 and that at the point 524.

Further, as described above, at the point T0 in time where it is determined that the vehicle enters the curve entrance presently, the point TP0 corresponding to the curve-entrance point is calculated as the current position. Further, at the point T3 in time where it is determined that the vehicle leaves the curve exit presently, the point TP3 corresponding to the curve-exit point is calculated as the current position.

That is to say, when the vehicle travels through the curve section, the above-described embodiments show that the current position is calculated so that the azimuth angle of a predetermined point on the actual road, corresponding to a point that is shown on the link and that is calculated as the current position, agrees with the current road-azimuth angle calculated on the basis of the travel locus according to the azimuth angle of each point on the actual road corresponding to points on the links, where the azimuth angle is calculated according to the curvature of each point on the actual road that correspond to points on the links and that are estimated on the basis of the links.

Subsequently, it becomes possible to calculate the current position as a position on the link corresponding to the real current position, as shown in FIG. 6, irrespective of whether the vehicle travels on the inner lane or on the outer lane of the road.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A navigation device for a motor vehicle that calculates a current position, the navigation device comprising:
a map-data-storage unit storing map data defining a map including a road by using at least one link which is a line;
a vehicle-speed-measuring unit to measure a speed of the motor vehicle;
an angular-velocity-measuring unit to measure an angular velocity of a change in a travel azimuth of the motor vehicle; and
a current-position-calculation unit to calculate the current position of the motor vehicle,
wherein the current-position-calculation unit includes:
a curvature-estimation unit to estimate a road curvature at a first point on a road, the first point corresponding to a second point on the link, as a corresponding curvature of the second point on the link on the basis of the map data stored in the map-data-storage unit, where the corresponding curvature is estimated for each of a plurality of the second points on the link indicating a road on which the motor vehicle is traveling, the road including the current position that was previously calculated;
a start-point-corresponding-position-calculation unit to calculate the second point corresponding to a start point of a road-curve section where an orientation of the actual road changes, as a curve-section-start-point-corresponding position, on the basis of the estimated corresponding curvature of each of the plurality of second points on the link; and
a current-position-estimation unit to detect that the motor vehicle enters the road-curve section when a first change occurs in a curvature of a travel locus of the motor vehicle, the travel locus being calculated on the basis of a progress of the measured vehicle speed and angular velocity, where the first change matches with a second change in the corresponding curvature, the second change being caused when the motor vehicle travels on the link from outside a first section that is on the link and that corresponds to the road-curve section, passes the curve-section-start-point-corresponding position, and enters the first section, and that is configured to estimate the calculated curve-section-start-point-corresponding position as the current position when it is detected that the motor vehicle enters the road-curve section.

2. The navigation device according to claim 1, further comprising:
an end-point-corresponding-position-calculation unit to calculate a third point that is on the link and that corresponds to an end point of the road-curve section where the orientation of the actual road changes, as a curve-section-end-point-corresponding position, on the basis of the estimated corresponding curvature of each of the plurality of second points on the link,
wherein the current-position-calculation unit detects that the motor vehicle leaves the road-curve section when a third change occurs in the curvature of the travel locus of the motor vehicle, the travel locus being calculated on the basis of the progress of the measured vehicle speed and angular velocity, where the third change matches with a fourth change in the corresponding curvature, the fourth change being caused when the motor vehicle travels on the link from the first section that is on the link and that corresponds to the road-curve section, passes the curve-section-end-point-corresponding position, and leaves the first section, and that is configured to estimate the calculated curve-section-end-point-corresponding position as the current position when it is detected that the motor vehicle leaves the road-curve section.

3. The navigation device according to claim 2, further comprising a corresponding-azimuth-angle-estimation unit to estimate an azimuth angle of a road orientation at the first point on the road, the first point corresponding to the second point on the link, as a corresponding-azimuth angle of the second point on the link, on the basis of the estimated corresponding curvature of each of the plurality of second points on the link, where the corresponding-azimuth angle is estimated for each of the plurality of second points on the link indicating the road on which the motor vehicle is traveling, the road including the current position that was previously calculated,
wherein, after it is detected that the motor vehicle enters the road-curve section, the current-position-estimation unit calculates an azimuth angle in a travel direction of the motor vehicle as a travel-azimuth angle, on the basis of the progress of the measured angular velocity until it is detected that the motor vehicle leaves the road-curve section, and estimates a fourth point on the link as the current position, where the estimated corresponding azimuth angle agrees with the calculated travel-azimuth angle at the fourth point.

4. The navigation device according to claim 1, further comprising a corresponding-azimuth-angle-estimation unit to estimate an azimuth angle of a road orientation at the first point on the actual road, the first point corresponding to the second point on the link, as a corresponding-azimuth angle of the second point on the link, on the basis of the estimated corresponding curvature of each of the plurality of second points on the link, where the corresponding-azimuth angle is estimated for each of the plurality of second points on the link indicating the road on which the motor vehicle travels, the road including the current position that was previously calculated, wherein, after it is detected that the motor vehicle enters the road-curve section, the current-position-estimation unit calculates an azimuth angle of a direction in which the motor vehicle travels as a travel-azimuth angle, on the basis of the progress of the measured angular velocity, and estimates a fourth point on the link as the current position, where the estimated corresponding azimuth angle agrees with the calculated travel-azimuth angle at the fourth point.

5. The navigation device according to claim 1, wherein the curvature-estimation unit determines the second point where the corresponding curvature is estimated to be an estimation point, determines an average length of at least two links around the estimation point to be a reference distance, determines two points to be a first reference point and a second reference point when a journey distance between the first and second reference points becomes the reference distance, the journey distance extending from the estimation point along the link, calculates an azimuth difference between a first orientation from the first reference point to the estimation point and a second orientation from the estimation point to the second reference point, and estimates the road curvature at a fifth point on the actual road, the fifth point corresponding to the estimation point, based on the premise that the azimuth difference calculated for the reference distance occurs.

6. A navigation device for a motor vehicle that calculates a current position, the navigation device comprising:
a map-data-storage unit storing map data defining a map including a road by using at least one link which is a line;
a vehicle-speed-measuring unit to measure a speed of the motor vehicle;
an angular-velocity-measuring unit to measure an angular velocity of a change in a travel azimuth of the motor vehicle; and
a current-position-calculation unit to calculate the current position of the motor vehicle,
wherein the current-position-calculation unit includes:
a curvature-estimation unit to estimate a road curvature at a first point on a road, the first point corresponding to a second point on the link, as a corresponding curvature of the second point on the link on the basis of the map data stored in the map-data-storage unit, where the corresponding curvature is estimated for each of a plurality of the second points on the link indicating a road on which the motor vehicle is traveling, the road including the current position that was previously calculated;
an end-point-corresponding-position-calculation unit to calculate a third point that is on the link and that corresponds to an end point of the road-curve section where the orientation of the actual road changes as a curve-section-end-point-corresponding position, on the basis of the estimated corresponding curvature of each of the plurality of second points on the link; and
a current-position-estimation unit to detect that the motor vehicle leaves the road-curve section when a first change occurs in a curvature of a travel locus of the motor vehicle, the travel locus being calculated on the basis of a progress of the measured vehicle speed and angular velocity, where the first change matches with a second change in the corresponding curvature, the second change being caused when the motor vehicle travels on the link from a first section that is on the link and that corresponds to the road-curve section, passes the curve-section-end-point-corresponding position, and leaves the first section, and that is configured to estimate the calculated curve-section-end-point-corresponding position as the current position when it is detected that the motor vehicle leaves the road-curve section.

7. The navigation device according to claim 6, wherein the curvature-estimation unit determines the second point where the corresponding curvature is estimated to be an estimation point, determines an average length of at least two links around the estimation point to be a reference distance, determines two points to be a first reference point and a second reference point when a journey distance between the first and second reference points becomes the reference distance, the journey distance extending from the estimation point along the link, calculates an azimuth difference between a first orientation from the first reference point to the estimation point and a second orientation from the estimation point to the second reference point, and estimates the road curvature at a fourth point on the actual road, the fourth point corresponding to the estimation point, based on the premise that the azimuth difference calculated for the reference distance occurs.

8. A navigation device for a motor vehicle that calculates a current position, the navigation device comprising:
a map-data-storage unit storing map data defining a map including a road by using at least one link which is a line;
an angular-velocity-measuring unit to measure an angular velocity of a change in a travel azimuth of the motor vehicle; and
a current-position-calculation unit to calculate the current position of the motor vehicle,
wherein the current-position-calculation unit includes:
a corresponding-azimuth-angle-estimation unit configured to estimate an azimuth angle of a road orientation at a first point on a road, the first point corresponding to a second point on the link as a corresponding-azimuth angle of the second point on the link, on the basis of the stored map data, where the corresponding-azimuth angle is estimated for each of the plurality of second points on the link indicating the road on which the motor vehicle is traveling, the road including the current position that was previously calculated; and
a current-position-estimation unit configured to calculate an azimuth angle in a travel direction of the motor vehicle as a travel-azimuth angle, on the basis of a progress of the measured angular velocity, and estimate a third point on the link as the current position, where the estimated corresponding azimuth angle agrees with the calculated travel-azimuth angle at the third point.

9. The navigation device according to claim 8, further comprising:
a vehicle-speed-measuring unit to measure a speed of the motor vehicle; and
a curve-section-start-point-passing-calculation unit to calculate a road-curve-travel-start time where the motor vehicle passes a start point of a road-curve section where an orientation of the actual road changes on the basis of the map data and a travel locus of the motor vehicle, the travel locus being obtained on the basis of a progress of the measured vehicle speed and angular velocity, and calculate the road-curve-section-start point where the motor vehicle passes at the road-curve-travel-start time as a road-curve-section-passing-start point, wherein the corresponding-azimuth-angle-estimation unit estimates an azimuth angle of a first road orientation at the first point on the actual road, the first point corresponding to the second point on the link, where the azimuth angle is relative to a second road orientation of the calculated road-curve-section-passing-start point, as the corresponding-azimuth angle of the second point on the link, and wherein the current-position-estimation unit calculates an azimuth angle in a travel direction of the motor vehicle, the azimuth angle being relative to an azimuth angle in a travel direction of the motor vehicle at the calculated road-curve-travel-start point, as the travel-azimuth angle.

10. The navigation device according to claim 8, wherein the corresponding-azimuth-angle-estimation unit includes a curvature-estimation unit configured to estimate a road curvature at the first point on the actual road, the first point corresponding to the second point on the link, as a corresponding curvature of the second point on the link, where the corresponding curvature is estimated for each of the plurality of second points on the link, and estimates the corresponding-azimuth angle of the second point on the link on the basis of the estimated corresponding curvature.

11. The navigation device according to claim 10, wherein the curvature-estimation unit determines the second point where the corresponding curvature is estimated to be an estimation point, determines an average length of at least two links around the estimation point to be a reference distance, determines two points to be a first reference point and a second reference point when a journey distance between the first and second reference points becomes the reference distance, the journey distance extending from the estimation point along the link, calculates an azimuth difference between a first orientation from the first reference point to the estimation point and a second orientation from the estimation point to the second reference point, and estimates the road curvature at a fourth point on the actual road corresponding to the estimation point, based on the premise that the azimuth difference calculated for the reference distance occurs.

12. A current-position-calculation method to calculate a current position by using a navigation device storing map data defining a map including a road by using at least one link which is a line, the current-position-calculation method comprising:

measuring a speed of the motor vehicle and an angular velocity of a change in a travel azimuth of the motor vehicle;

estimating a road curvature at a first point on a road, the first point corresponding to a second point on the link, as a corresponding curvature of the second point on the link on the basis of the map data, where the corresponding curvature is estimated for each of a plurality of the second points on the link indicating a road on which the motor vehicle is traveling, the road including the current position that was previously calculated;

calculating the second point corresponding to a start point of a road-curve section where an orientation of the road changes, as a curve-section-start-point-corresponding position, on the basis of the estimated corresponding curvature of each of the plurality of second points on the link; and detecting that the motor vehicle enters the road-curve section when a first change occurs in a curvature of a travel locus of the motor vehicle, the travel locus being calculated on the basis of a progress of the measured vehicle speed and angular velocity, where the first change matches with a second change in the corresponding curvature, the second change being caused when the motor vehicle travels on the link from outside a first section that is on the link and that corresponds to the road-curve section, passes the curve-section-start-point-corresponding position, and enters the first section, and calculating the curve-section-start-point-corresponding position as the current position, when it is detected that the motor vehicle enters the road-curve section.

13. A current-position-calculation method to calculate a current position by using a navigation device storing map data defining a map including a road by using at least one link which is a line, the current-position-calculation method comprising:

measuring a speed of the motor vehicle and an angular velocity of a change in a travel azimuth of the motor vehicle;

estimating a road curvature at a first point on a road, the first point corresponding to a second point on the link, as a corresponding curvature of the second point on the link on the basis of the map data, where the corresponding curvature is estimated for each of a plurality of the second points on the link indicating a road on which the motor vehicle is traveling, the road including the current position that was previously calculated;

calculating a third point that is on the link and that corresponds to an end point of a road-curve section where an orientation of the road changes as a curve-section-end-point-corresponding position, on the basis of the estimated corresponding curvature of each of the plurality of second points on the link, detecting that the motor vehicle leaves the road-curve section when a first change occurs in a curvature of a travel locus of the motor vehicle, the travel locus being calculated on the basis of a progress of the measured vehicle speed and angular velocity, where the first change matches with a second change in the corresponding curvature, the second change being caused when the motor vehicle travels on the link from a first section that is on the link and that corresponds to the road-curve section, passes the curve-section-end-point-corresponding position, and leaves the first section, and calculating the curve-section-end-point-corresponding position as the current position when it is detected that the motor vehicle leaves the road-curve section.

14. A current-position-calculation method to calculate a current position by using a navigation device storing map data defining a map including a road by using at least one link which is a line, the current-position-calculation method comprising:

measuring an angular velocity of a change in a travel azimuth of the motor vehicle;

estimating an azimuth angle of a road orientation at a first point on a road, the first point corresponding to a second point on the link, as a corresponding-azimuth angle of the second point on the link on the basis of the map data, where the corresponding-azimuth angle is estimated for each of a plurality of the second points on the link indicating a road on which the motor vehicle is traveling, the road including the current position that was previously calculated; and calculating an azimuth angle in a travel direction of the motor vehicle as a travel-azimuth angle on the basis of a progress of the measured angular velocity, and calculating a third point on the link as the current position, where the estimated corresponding-azimuth angle agrees with the calculated travel-azimuth angle at the third point.

15. The current-position-calculation method according to claim 14, further comprising:

measuring a speed of the motor vehicle; and calculating a road-curve-travel-start time where the motor vehicle passes a start point of a road-curve section where an orientation of the road changes on the basis of the map data and a travel locus of the motor vehicle, the travel locus being obtained on the basis of a progress of the measured vehicle speed and angular velocity, and calculating the road-curve-section-start point where the motor vehicle passes at the road-curve-travel-start time as a road-curve-section-passing-start point, wherein an azimuth angle of a first road orientation at the first point on the road, the first point corresponding to each of the plurality of second points on the link, is estimated as the corresponding-azimuth angle, where the azimuth angle is relative to a second road orientation of the calculated road-curve-section-passing-start point, and wherein an azimuth angle in a travel direction of the motor vehicle is calculated, the azimuth angle being relative to an azimuth angle in a travel direction of the motor vehicle at the calculated road-curve-travel-start point as the travel-azimuth angle.

16. The current-position-calculation method according to claim 14, wherein a road curvature at the first point on the actual road is estimated, the first point corresponding to each of the plurality of second points on the link, as a corresponding curvature at the second point on the link, and the corresponding-azimuth angle of the second point on the link is estimated on the basis of the estimated corresponding curvature.

17. The current-position-calculation method according to claim 16, wherein the second point where the corresponding curvature is estimated is determined to be an estimation point, an average length of at least two links around the estimation point is determined to be a reference distance, two points are determined to be a first reference point and a second reference point when a journey distance between the first and second reference points becomes the reference distance, the journey distance extending from the estimation point along the link, an azimuth difference between a first orientation from the first reference point to the estimation point and a second orientation from the estimation point to the second reference point is calculated, and the road curvature at a fourth point on the road is estimated, the fourth point corresponding to the estimation point, based on the premise that the azimuth difference calculated for the reference distance occurs.

18. A computer program product which is read and executed by an electronic calculator mounted on a motor vehicle, the computer program product making the electronic calculator perform:

measuring a speed of the motor vehicle and an angular velocity of a change in a travel azimuth of the motor vehicle;

estimating a road curvature at a first point on a road, the first point corresponding to a second point on at least one link which is a line, as a corresponding curvature of the second point on the link on the basis of map data defining a map including a road by using the link, where the corresponding curvature is estimated for each of a plurality of the second points on the link indicating a road on which the motor vehicle is traveling, the road including the current position that was previously calculated;

calculating the second point corresponding to a start point of a road-curve section where an orientation of the actual road changes as a curve-section-start-point-corresponding position, on the basis of the estimated corresponding curvature of each of the plurality of second points on the link; and detecting that the motor vehicle enters the road-curve section when a first change occurs in a curvature of a travel locus of the motor vehicle, the travel locus being calculated on the basis of a progress of the measured vehicle speed and angular velocity, where the first change matches with a second change in the corresponding curvature, the second change being caused when the motor vehicle travels on the link from outside a first section that is on the link and that corresponds to the road-curve section, passes the curve-section-start-point-corresponding position, and enters the first section, and calculating the curve-section-start-point-corresponding position as the current position when it is detected that the motor vehicle enters the road-curve section.

19. A computer program product which is read and executed by an electronic calculator mounted on a motor vehicle, the computer program product making the electronic calculator perform:

acquiring a speed of the motor vehicle and an angular velocity of a change in a travel azimuth of the motor vehicle;

estimating a road curvature at a first point on a road, the first point corresponding to a second point on at least one link which is a line, as a corresponding curvature of the second point on the link on the basis of map data defining a map including a road by using the link, where the corresponding curvature is estimated for each of a plurality of the second points on the link indicating a road on which the motor vehicle is traveling, the road including the current position that was previously calculated;

calculating a third point that is on the link and that corresponds to an end point of a road-curve section where an orientation of the road changes as a curve-section-end-point-corresponding position on the basis of the estimated corresponding curvature of each of the plurality of second points on the link; and detecting that the motor vehicle leaves the road-curve section when a first change occurs in a curvature of a travel locus of the motor vehicle, the travel locus being calculated on the basis of a progress of the acquired vehicle speed and angular velocity, where the first change matches with a second change in the corresponding curvature, the second change being caused when the motor vehicle travels on the link from a first section that is on the link and that corresponds to the road-curve section, passes the curve-section-end-point-corresponding position, and leaves the first section, and calculating the curve-section-end-point-corresponding position as the current position when it is detected that the motor vehicle leaves the road-curve section.

20. A computer program product which is read and executed by an electronic calculator mounted on a motor vehicle, the computer program product making the electronic calculator perform:

acquiring an angular velocity of a change in a travel azimuth of the motor vehicle;

estimating an azimuth angle of a road orientation at a first point on a road, the first point corresponding to a second point on at least one link which is a line, as a corresponding-azimuth angle of the second point on the link, on the basis of map data defining a map including a road by using the link, where the corresponding-azimuth angle is estimated for each of a plurality of the second points on the link indicating a road on which the motor vehicle is traveling, the road including the current position that was previously calculated; and calculating an azimuth angle in a travel direction of the motor vehicle as a travel-azimuth angle on the basis of a progress of the acquired angular velocity, and calculating a third point on the link as the current position where the estimated corresponding-azimuth angle agrees with the calculated travel-azimuth angle at the third point.

* * * * *